3,306,766
PACKAGING PRODUCT WITH COMPOSITE RESIN COATINGS AND METHOD OF PRODUCING SAME

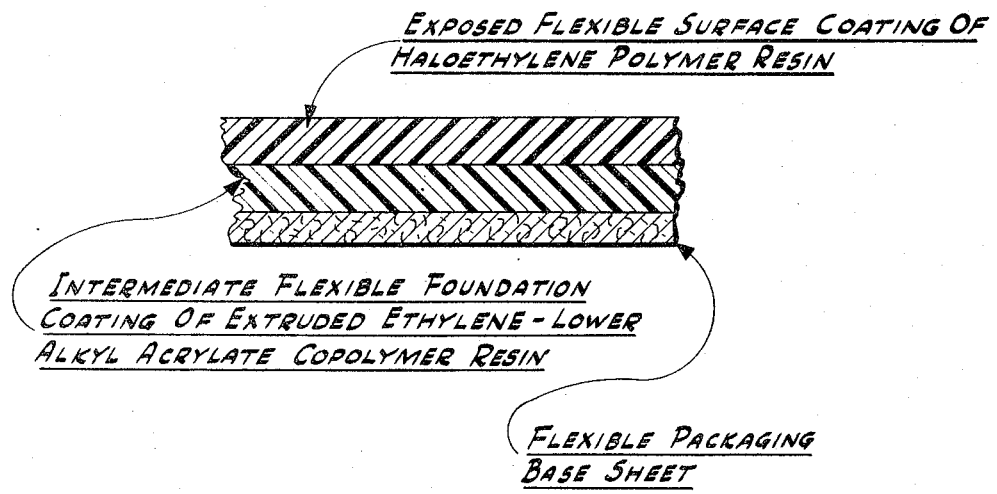

Charles T. Hathaway, Danville, and Raymond K. Cohen, San Leandro, Calif., assignors to Crown Zellerbach Corporation, San Francisco, Calif., a corporation of Nevada
Filed July 10, 1963, Ser. No. 293,979
9 Claims. (Cl. 117—76)

This invention relates to resin coated packaging products, especially flexible paper base sheets, and more particularly to a composite coating thereon wherein the exposed flexible surface coating is a haloethylene polymer resin, known as saran, and an intermediate flexible foundation coating of extruded ethylene-lower alkyl acrylate copolymer resin is adhesively bonded to the base sheet with the saran coating adhesively bonded to the foundation coating.

Haloethylene polymer resins are known to provide excellent barrier properties as they are resistant to penetration of substances, such as oil, grease, water vapor, gases, aromas, flavors and odors, and are hence frequently employed for such purposes as coatings on packaging sheets and containers. Saran can be applied as a coating by liquid deposition, either as a lacquer from a solvent solution of the resin or from an aqueous latex type emulsion thereof. The liquid of the coating, especially water, will strike into raw paper base sheets with the result that some of the saran penetrates into the interstices of the fibers, and thus becomes absorbed by the sheet.

Since saran is comparatively expensive, such strike-in is undesirable. Consequently it is desirable that an intermediate foundation liquid impermeable coating be applied to the paper before application of the saran coating to preclude such strike-in, and to enable formation of a smooth continuous surface coating of the saran.

Polyethylene has been employed as such intermediate foundation coating but with polyethylene the problem arises of obtaining a strong bond with many surface coatings including saran haloethylene polymer resins. Consequently, it is frequently necessary to treat the polyethylene, such as by flame treatment or the like, to render it strongly adherent to the haloethylene polymer resin. In Patent No. 2,975,074, dated March 14, 1961, a chlorinated polyethylene resin is disclosed as being advantageous compared to polyethylene alone, as an intermediate foundation coating for haloethylene polymer resins.

Summarizing the present invention, it comprises utilizing as the foundation or intermediate liquid impermeable coating for a saran surface coating, an ethylene-alkyl acrylate copolymer resin of the particular character disclosed in Patent No. 2,953,551, dated Sept. 20, 1960. Such ethylene-alkyl acrylate copolymer resin has been found to provide superior and improved adhesion with an exposed surface layer of a saran haloethylene polymer resin, even to the extent that flame treatment or the like need not be employed on the uncoated surface of the ethylene-alkyl acrylate copolymer even when the haloethylene saran polymer is to be subsequently coated thereover by deposition from aqueous latex type emulsions thereof.

Thus, this invention has as its objects, among others, the provision of an improved intermediate foundation coating on a packaging product, such as flexible packaging paper, which possesses superior wettability and adhesiveness for either the lacquer or water emulsion latex form of saran to be coated thereon, has superior bonding properties with the saran, is comparatively inexpensive, which in itself is so flexible as to impart enhanced flexibility to the packaging sheet as a whole, and which prevents strike-in of liquid, particularly water, in which the haloethylene polymer resin is contained. Other objects will become apparent from a perusal of the following description with accompanying drawing; the single figure of the drawing being a cross-section of a composite resin coated flexible packaging sheet.

As is described in the aforementioned Patent No. 2,975,074, the haloethylene polymer resin employed for coating the surface of the intermediate foundation coating or layer of ethylene-alkyl acrylate resin may advantageously be polyvinylchloride or a copolymer of vinyl chloride and vinyl acetate containing at least about 80 percent by weight of vinyl chloride polymerized in the copolymer molecule. It may also be a saran copolymer of vinylidene chloride and vinyl chloride, a saran copolymer of vinylidene chloride and acrylonitrile or a saran copolymer of vinylidene chloride and acrylic acid or its ester derivatives including methyl acrylate, ethyl acrylate and the like.

It is particularly advantageous to employ crystalline saran copolymers and even more advantageous, in many instances, to utilize such copolymers of vinyl chloride and vinylidene chloride as may contain at least about 80 percent by weight of vinylidene chloride polymerized in the copolymer molecule or such copolymers of vinylidene chloride and acrylonitrile (vinyl cyanide) as may contain at least 60 and, preferably, from 85 to 95 percent by weight of vinylidene chloride polymerized in the copolymer molecule. The bromo, fluoro and mixed halogen analogs of the above polymers, especially those containing acidic hydrogen atoms, may also be empolyed suitably as the haloethylene polymer resins in the practice of the invention. However, iodine containing haloethylene polymer resins are not desirable. Thus, the haloethylene polymer may contain a halogen of atomic number from 9 to 35, inclusive.

The haloethylene polymer resins may be utilized suitably in various ways to obtain a layer of the top coating resin on the intermediate foundation or substrate layer of the ethylene-alkyl acrylate foundation resin which is adhesively bonded to the base sheet as a continuous layer. They may be coated onto the surface of the aforementioned foundation resin from a dissolved composition that has been formulated with suitable solvents, such as in lacquer formulations, or they may be deposited from aqueous latex type emulsions, or with polymerizing mixtures of the monomeric substances which are polymerized in the haloethylene polymer resin.

Application of the haloethylene polymer resin may be accomplished in any conventional manner. After their application, the haloethylene polymer resin compositions may be dried, cured or treated according to usual and conventional procedures to remove or countereffect solvents, vehicles or other admixed ingredients, and thus effect a solid deposition of the tightly adhering resin layer in the composite structure.

The ethylene-alkyl acrylate copolymer is of the type described in aforementioned Patent No. 2,953,551, and can be obtained by copolymerizing ethylene with from about 0.2 to about 1.5 moles, and preferably from about 0.4 to about 1 mole, of an alkyl acrylate per 100 moles of ethylene in the presence of a free radical catalyst at pressures of from about 20,000 p.s.i. to about 40,000 p.s.i. or higher; and at polymerization temperatures of from about 100° C. to about 350° C., preferably from about 160° C. to about 250° C. The resultant copolymers have a density of about 0.915 to about 0.94 gram per cc. at 23° C.

The alkyl acrylates employed in the reaction are the lower alkyl acrylates containing from 1 to about 12 carbon atoms in the alkyl radical and preferably from 2 to about 6 carbon atoms in the alkyl radical. Illustrative of the acrylates found suitable are ethyl acrylate, propyl acrylate, pentyl acrylate, 2-ethylhexyl acrylate, decyl acrylate, and the like; preferably free of inhibitors which are usually found in alkyl acrylates. The alkyl acrylate concentration is critical, and should be kept within the limits specified in order to achieve the desired products. Exceeding the amounts indicated leads to rubbery, tacky, elastomeric products which are unsatisfactory herein.

Among the catalysts which can be used in effecting the copolymerization are a source of oxygen, such as molecular oxygen, which is preferred, and materials which yield oxygen under the reaction conditions, such as peroxide compounds. Illustrative peroxide compounds are hydrogen peroxide, persuccinic acid, lauroyl peroxide, butyryl peroxide, benzoyl peroxide, acetyl peroxide, peracetic acid di-tert.-butyl peroxide, the alkali metal persulfates, perborates and percarbonates, diisopropyl peroxydicarbonate, and the like. The concentration of the catalyst can be varied from about 0.001 to about 5 mole percent based on the total weight of the polymerizable monomers charged. The preferred catalyst is, however, molecular oxygen at a concentration of from about 20 to about 200 parts per million.

The particular ethylene-lower alkyl acrylate copolymer most advantageously employed herein is of the type described in Example 5 of the aforementioned Patent No. 2,953,551, the characteristics of which are outlined in the table in columns 5 and 6 of such patent under Example 5. Such resin is a solid at room temperature, and the reaction product of about 1.4 moles of ethyl acrylate per 100 moles of ethylene having in the resin about 4.1 moles percent and 13.2 weight percent of ethyl acrylate, with a density of about 0.9346 gram per cc. at 23° C. and a melt index dg./min. of about 2.5.

The described ethylene-lower alkyl acrylate copolymer resins are solids at room temperature, and are advantageously deposited by die extrusion onto the base sheet, such as any of the well known types of flexible packaging paper, for example, freezer and bread wraps, or stock for packages in container form for the packaging of various liquids such as juices and milk, inner ply multiwall bag stock for the packaging of grease and oil products, and also aluminum and other metal foil base sheets.. Any conventional die extrusion apparatus can be employed by which the ethylene-lower alkyl acrylate resin is continuously extruded directly onto a continuously moving web of the base sheet from a conventional slotted and heated extrusion die from which the molten resin is forced under pressure to provide a continuous foundation coating layer or film on the base sheet. The amount of such resin applied is not particularly critical but an advantageous range is from 2 to 20 lbs. per ream (3,000 square feet of surface) directly onto a surface of the base sheet. This results in a coating film thickness of about 0.13 to 1.3 mils. A preferred film thickness on a paper base is about 0.45 mil obtained by application thereto of about 7 lbs. of resin per ream.

After deposition of the ethylene-lower alkyl acrylate resin onto the base sheet and after such resin has set, the liquid containing haloethylene polymer saran resin is applied as a continuous coating directly thereto. Any suitable coating method may be employed to apply the liquid saran containing resin onto the foundation layer, such as by brushing, spraying, air knife, metering bar, falling curtain, size press, knurled applicator roll of the rotogravure type or trailing blade.

With the aqueous emulsion form of the haloethylene polymer, a conventional air knife method has been found advantageous wherein a web previously coated with the ethylene-lower alkyl acrylate copolymer resin adhered thereto is passed over an applicator roll turning in a pan containing the emulsion; the applicator roll applying an excess of coating which is doctored in a conventional manner by a jet of air from the air knife. The pressure of the air leaving the knife controls the coating weight and provides a uniform smooth continuous surface film. When the saran resin is applied in lacquer form, namely, dissolved in a solvent, an advantageous method of coating is by a knurled applicator roll of the rotogravure type.

In lacquer form, usually only one coating pass or in other words application, is made on the ethylene-lower alkyl acrylate foundation coating because if more than one coating layer is applied to build up film thickness, the solvent of subsequent coats will tend to attack the first coat. A suitable range of application of the lacquer form is about 1 to 3 lbs. of resin per ream (3,000 sq. ft. of surface), which will provide a film thickness of the saran of about 0.05 to 0.15 mil, and preferably about 2 lbs. per ream with a resultant film thickness of about 0.1 mil. As previously related, the ethylene lower-alkyl acrylate copolymer impermeable foundation coating prevents strike-in of the solvent thereby permitting the entire weight of saran applied to be effective as a surface barrier coating.

With the aqueous emulsion form, build-up of the saran coating thickness can be effected by application of more than one coat thereof, as the water does not attack previously applied coats. A suitable range of saran resin deposited onto the foundation layer from the emulsion form is about 2 to 30 lbs. of resin per ream which will provide a mil thickness of about 0.08 to 1.2, and preferably about 7 lbs. per ream with a resultant mil thickness of about 0.28. The overall range inclusive of both lacquer and water emulsion form of application thus varies from about 0.05 to 1.2 mil thickness of the exposed saran film.

As previously mentioned, the ethylene-lower alkyl acrylate copolymer resin foundation film is extremely superior in precluding strike-in of water into a paper base sheet. Consequently, such type of foundation sheet materially improves the effectiveness of single coat application of the saran resin by permitting the entire weight of saran applied to be available as a smooth continuous barrier coating. After the liquid coatings have dried in any conventional manner, such as by oven drying or even air drying, the adhesive bond of the haloethylene polymer resin to the ethylene-lower alkyl acrylate copolymer resin is so tight that it is not possible to peel the saran coating from the surface of the foundation layer of the ethylene-lower alkyl acrylate, by the pressure sensitive tape test described in column 4 of the aforementioned Patent No. 2,975,074, irrespective of the amount of force applied.

Moreover, the bond between the foundation layer and the saran surface coating is not readily loosened when the sheet is immersed in water. Since the saran coating will not peel away from the foundation layer, the flexing of the sheet when passed over former and packaging machinery, will not cause flaking off of the saran coating; nor will the saran coating separate from the foundation layer along seams prepared by heat sealing or by adhesives. Also, the ethylene-lower alkyl acrylate copolymer resin coating possesses great flexibility; and because it can be extruded onto a flexible base sheet, flexibility of the composite structure is enhanced.

The following examples are illustrative of particular embodiments of the invention:

Example 1

As the flexible base sheet conventional 50 lb. per ream kraft paper suitable for the inner ply of a multi-wall bag intended for packaging of a grease containing product, is employed. The particular ethylene-lower alkyl acrylate copolymer resin is that of Example 5 of Patent No. 2,953,551 (comparable to Union Carbide DPDB–6169). The particular haloethylene polymer resin is a solid saran copolymer of vinylidene chloride and acrylonitrile containing about 89 percent by weight of vinylidene chloride polymerized in the copolymer molecule (comparable to Dow F–220). It is dissolved in methyl ethyl ketone as the solvent to the extent that the solids content of the resin-solvent solution is about 20% by weight.

The solid ethylene-lower alkyl acrylate resin is continuously extruded directly onto a continuously moving web of the paper in a conventional manner from a conventionally heated slotted extrusion die from which the resin is forced under pressure. The amount of resin applied per ream is about 7 lbs. which provides a continuous foundation coating of about 0.45 mil in thickness, strongly adhered to the paper base sheet. After such resin has been applied and set, the saran resin solution is applied directly thereover as a continuous coating while the base sheet and previously applied foundation coating are continuously moving. Application is by any conventional coating procedure, desirably by a knurled applicator roll of the rotogravure press type. The amount applied is about 2 lbs. of resin per ream, which after drying of the saran coating provides an exposed continuous saran layer of about 0.1 mil thick directly bonded to the ethylene-lower alkyl acrylate layer.

The bond of the saran layer to the ethylene-lower alkyl acrylate foundation layer is so tight that it is not possible to break the bond with the cellophane tape test described in the aforementioned Patent No. 2,975,074, regardless of the amount of force applied. Also, there is no strike-in of solvent into the foundation layer.

*Example II*

The paper, ethylene-lower alkyl acrylate resin, and manner of applying the same are the same as in Example I. However, the saran coating is applied from an aqueous latex type emulsion, and the resin is a copolymer of vinylidene chloride and methyl acrylate containing about 85% by weight of vinylidene chloride polymerized in the copolymer molecule; the emulsion containing about 60% by weight solids (comparable to Dewey and Almy "Daran" 210).

Application of the emulsion directly to the foundation coating can be by any conventional coating method. However, conventional air-knife doctoring is preferred in applying of the saran emulsion. The amount of emulsion applied is such as to provide about 7 lbs. per ream of resin adhered directly to the foundation layer, which after conventional drying results in a coating of about 0.28 mil in thickness. No penetration of water occurs through the foundation layer, and the bond is the same as in Example I.

Although the invention has found particular applicability in the coating of various flexible paper packaging sheets and wrappers, and paper sheets for pouches and containers, it is also applicable for the coating of other sheets or webs such as flexible aluminum and other metal foil because of the extremely strong bond which is not only effected between the ethylene lower-alkyl acrylate copolymer resin foundation coating and a metal base sheet, but also between such resin and the haloethylene polymer surface resin coating.

We claim:

1. A packaging base sheet coated with an exposed continuous surface layer of a haloethylene polymer, and an intermediate continuous foundation layer of an ethylene-lower alkyl acrylate copolymer; the haloethylene polymer comprising a halogen selected from the group consisting of chlorine, fluorine and bromine, and being selected from the group consisting of vinyl halide polymers containing in the polymer molecule at least about 80 percent by weight of a polymerized vinyl halide, and vinylidene halide polymers containing in the polymer molecule at least about 60 percent by weight of polymerized vinylidene halide; and the ethylene-lower alkyl acrylate copolymer being the reaction product under heat and pressure of about 0.2 to 1.5 moles of a lower alkyl acrylate per 100 moles of ethylene, the lower-alkyl acrylate containing about 1 to 12 carbon atoms in the alkyl radical.

2. The product of claim 1 wherein the sheet is flexible packaging paper, the haloethylene polymer layer has a thickness of about 0.05 to 1.2 mils, and the ethylene-lower alkyl acrylate copolymer layer has a thickness of about 0.13 to 1.3 mils.

3. The coated product of claim 1 wherein the sheet is flexible packaging paper, the haloethylene polymer is a copolymer of vinylidene chloride and acrylonitrile containing about 89 percent by weight of vinylidene chloride polymerized in the copolymer molecule, and the ethylene-lower alkyl acrylate copolymer is the reaction product of about 1.4 moles of the lower alkyl acrylate per 100 moles of ethylene.

4. The coated product of claim 1 wherein the sheet is flexible packaging paper, the haloethylene polymer is a copolymer of vinylidene chloride and methyl acrylate containing about 85% by weight of vinylidene chloride polymerized in the copolymer molecule, and the ethylene-lower alkyl acrylate copolymer is the reaction product of about 1.4 moles of the lower alkyl acrylate per 100 moles of ethylene.

5. Heat sealable flexible packaging paper coated with an exposed surface layer of a haloethylene polymer, and an intermediate continuous foundation layer of an ethylene-lower alkyl acrylate copolymer; the haloethylene polymer comprising a halogen selected from the group consisting of chlorine, fluorine and bromine, and being selected from the group consisting of vinyl halide polymers containing in the polymer molecule at least about 80 percent by weight of a polymerized vinyl halide, and vinylidene halide polymers containing in the polymer molecule at least about 60 percent by weight of polymerized vinylidene halide; and the ethylene-lower alkyl acrylate copolymer being the reaction product under heat and pressure of about 0.2 to 1.5 moles of a lower alkyl acrylate per 100 moles of ethylene, the lower-alkyl acrylate containing about 1 to 12 carbon atoms in the alkyl radical; the adhesive bond between the haloethylene polymer surface layer to the ethylene-lower alkyl acrylate foundation layer being so tight that said surface layer is unpeelable from the surface of said foundation layer irrespective of the amount of force applied at room temperature to about a one-half by six inch strip of pressure sensitive regenerated cellulose adhesive tape which has been adhered to said surface layer by pressing the same thereto.

6. The method of manufacturing a resin coated flexible packaging sheet which comprises extrusion coating onto a flexible sheet a solid ethylene-lower alkyl acrylate copolymer in heated molten state to provide a continuous foundation layer strongly adherent to a surface of the sheet and to prevent strike-in of liquid of a subsequently applied liquid coating, and after said copolymer has set depositing onto said foundation layer by liquid deposition a haloethylene polymer to provide a continuous exposed surface layer strongly adherent to said foundation layer; the ethylene-lower alkyl acrylate copolymer being the reaction product under heat and pressure of about 0.2 to 1.5 moles of a lower alkyl acrylate per 100 moles of ethylene, the lower alkyl acrylate containing about 1 to 12 carbon atoms in the alkyl radical; and said haloethylene polymer comprising a halogen selected from the group consisting of chlorine, fluorine and bromine, and being selected from the group consisting of vinyl halide polymers containing in the polymer molecule at least about 80 percent by weight of a polymerized vinyl halide, and vinylidene halide polymers containing in the polymer molecule at least about 60 percent by weight of polymerized vinylidene halide.

7. The method of claim 6 wherein the sheet is paper and the haloethylene polymer is deposited over said ethylene-lower alkyl acrylate copolymer foundation layer from an aqueous emulsion and in amount to provide on said foundation layer a continuous coating of about 2 to 30 lbs. per ream.

8. The method of claim 6 wherein the sheet is paper and the haloethylene polymer is deposited over said ethylene-lower alkyl acrylate copolymer foundation layer a plurality of times from an aqueous emulsion thereof to build up the thickness of the layer of said haloethylene polymer.

9. The method of claim 6 wherein the haloethylene polymer is deposited onto said ethylene-lower alkyl acrylate copolymer foundation layer from a solvent solution and in amount to provide on said foundation layer a continuous coating of about 1 to 3 lbs. per ream.

References Cited by the Examiner

UNITED STATES PATENTS

| | | | |
|---|---|---|---|
| 2,507,699 | 5/1950 | Edgar et al. | 117—76 X |
| 2,519,068 | 8/1950 | Richardson | 117—76 |
| 2,953,551 | 9/1960 | White | 260—96.7 |
| 2,975,074 | 3/1961 | Jankens et al. | 117—76 |
| 3,231,411 | 1/1966 | Tyler et al. | 117—76 |

WILLIAM D. MARTIN, *Primary Examiner.*

R. HUSACK, *Assistant Examiner.*